(12) United States Patent
Morrison (10) Patent No.: US 9,638,786 B2
(45) Date of Patent: May 2, 2017

(54) SYSTEM AND METHOD FOR LOCATING A MOBILE TERMINAL IN A FINITE LOCATION

(75) Inventor: James Morrison, Henderson, NV (US)

(73) Assignee: Mobixity, Inc., Foster City, CA (US)

( * ) Notice: Subject to any disclaimer, the term of this patent is extended or adjusted under 35 U.S.C. 154(b) by 639 days.

(21) Appl. No.: 13/188,892

(22) Filed: Jul. 22, 2011

(65) Prior Publication Data

US 2012/0021763 A1    Jan. 26, 2012

Related U.S. Application Data

(60) Provisional application No. 61/366,777, filed on Jul. 22, 2010, provisional application No. 61/492,518, filed on Jun. 2, 2011.

(51) Int. Cl.
  *H04W 24/00* (2009.01)
  *G01S 5/14* (2006.01)

(52) U.S. Cl.
  CPC ...................... *G01S 5/14* (2013.01)

(58) Field of Classification Search
  CPC ................... H04W 4/02; H04W 4/04
  See application file for complete search history.

(56) References Cited

U.S. PATENT DOCUMENTS

| | | |
|---|---|---|
| 5,671,218 A * | 9/1997 | I et al. ........................ 370/252 |
| 6,841,994 B1 * | 1/2005 | Wiegert ...................... 324/244 |
| 7,305,245 B2 | 12/2007 | Alizadeh-Shabdiz |
| 7,403,762 B2 | 7/2008 | Morgan |
| 7,414,988 B2 | 8/2008 | Jones |
| 7,433,694 B2 | 10/2008 | Morgan |
| 7,471,954 B2 | 12/2008 | Brachet |
| 7,474,897 B2 | 1/2009 | Morgan |
| 7,493,127 B2 | 2/2009 | Morgan |
| 7,502,620 B2 | 3/2009 | Morgan |
| 7,515,578 B2 | 4/2009 | Alizadeh-Shabdiz |
| 7,551,579 B2 | 6/2009 | Alizadeh-Shabdiz |
| 7,551,929 B2 | 6/2009 | Alizadeh-Shabdiz |
| 7,768,963 B2 | 8/2010 | Alizadeh-Shabdiz |
| 7,769,396 B2 | 8/2010 | Alizadeh-Shabdiz |
| 7,818,017 B2 | 10/2010 | Alizadeh-Shabdiz |
| 7,835,754 B2 | 11/2010 | Alizadeh-Shabdiz |
| 7,856,234 B2 | 12/2010 | Alizadeh-Shabdiz |
| 2002/0082026 A1 * | 6/2002 | Narayanan .................... 455/456 |
| 2004/0127231 A1 * | 7/2004 | Dor et al. .................. 455/456.6 |

(Continued)

*Primary Examiner* — Shantell L Heiber
(74) *Attorney, Agent, or Firm* — Fisher Broyles, LLP; Rob L. Phillips (57) ABSTRACT

Embodiments of the present invention include methods, systems and computer program products. Systems, methods and computer program products of the various preferred embodiments can include one or more sensors disposable in a finite location and adapted to receive a communication channel signal from a mobile terminal located in the finite location and a controller connected to the one or more sensors and adapted to calculate a position of the mobile terminal within the finite location. The systems, methods and computer program products of the various preferred embodiments can also include a pseudo-station disposable in the finite location and connected to the controller and adapted to induce a communication channel signal from the mobile terminal by transmitting a control channel signal in the finite location.

42 Claims, 3 Drawing Sheets

---

S102: TRANSMITTING, FROM A PSEUDO-STATION DISPOSABLE IN A FINITE LOCATION, A CONTROL CHANNEL SIGNAL AT A PREDETERMINED FREQUENCY FOR A PREDETERMINED DURATION

S104: DETECTING, AT A SENSOR DISPOSABLE IN THE FINITE LOCATION, A COMMUNICATION CHANNEL SIGNAL TRANSMITTED BY A MOBILE TERMINAL IN THE FINITE LOCATION, WHEREIN THE COMMUNICATION CHANNEL SIGNAL COMPRISES A UNIQUE IDENTIFICATION OF THE MOBILE TERMINAL (56) References Cited

U.S. PATENT DOCUMENTS

| | | |
|---|---|---|
| 2006/0116130 A1* | 6/2006 | Kennedy, Jr. et al. .... 455/456.1 |
| 2007/0155411 A1 | 7/2007 | Morrison |
| 2008/0065507 A1 | 3/2008 | Morrison |
| 2008/0077956 A1 | 3/2008 | Morrison |
| 2009/0176511 A1 | 7/2009 | Morrison |
| 2009/0176512 A1 | 7/2009 | Morrison |
| 2009/0209233 A1 | 8/2009 | Morrison |
| 2009/0233575 A1 | 9/2009 | Morrison |
| 2009/0233633 A1 | 9/2009 | Morrison |
| 2010/0069093 A1 | 3/2010 | Morrison |
| 2010/0248745 A1* | 9/2010 | Ozawa et al. ............. 455/456.3 |
| 2010/0279686 A1* | 11/2010 | Tokgoz et al. ............. 455/435.1 |

* cited by examiner

SYSTEM AND METHOD FOR LOCATING A MOBILE TERMINAL IN A FINITE LOCATION

CLAIM OF PRIORITY

The present application claims priority to U.S. provisional patent application Ser. No. 61/366,777 filed on 22 Jul. 2010 and entitled "Systems and Methods for Networked Radio Systems and Coordinated Broadcasting," and U.S. provisional patent application Ser. No. 61/492,518 filed on 2 Jun. 2011 and entitled "System and Method for Locating a Mobile Terminal in a Finite Location," both of which are expressly incorporated herein by reference.

BACKGROUND AND SUMMARY

The present invention relates generally to location services and more specifically to methods, systems and computer program products configured for determining a presence or location of a mobile terminal in a finite or discrete location, such as for example location, a finite/outdoor location, an outdoor location, or any other suitable location having a limited or finite geometry.

A system of one preferred embodiment can include a pseudo-station disposable in a finite location, the pseudo-station adapted to transmit a control channel signal at a predetermined frequency for a predetermined duration; and a sensor disposable in the finite location, the sensor adapted to detect a communication channel signal transmitted by a mobile terminal in the finite location, wherein the communication channel signal includes a unique identification of the mobile terminal.

A method of another preferred embodiment can include transmitting, from a pseudo-station disposable in a finite location, a control channel signal at a predetermined frequency for a predetermined duration; and detecting, at a sensor disposable in the finite location, a communication channel signal transmitted by a mobile terminal in the finite location, wherein the communication channel signal includes a unique identification of the mobile terminal.

A system of another preferred embodiment can include a sensor array disposable in a finite location and adapted to receive a communication channel signal from a mobile terminal located in the finite location; a controller connected to the sensor array and adapted to calculate a three-dimensional position of the mobile terminal within the finite location; and a pseudo-station disposable in the finite location and connected to the controller and adapted to induce a communication channel signal from the mobile terminal by transmitting a control channel signal in the finite location.

A system according to another preferred embodiment can include a pseudo-station disposable in a finite location and adapted to transmit a control channel signal; and a controller connected to the pseudo-station and adapted to control the pseudo station to transmit the control channel signal at a predetermined frequency and for a predetermined duration. The controller can be further adapted to calculate a position of a mobile terminal within the finite location in response to a detected communication channel signal from the mobile terminal, the communication channel signal induced in response to the control channel signal.

A system according to another preferred embodiment can include a sensor array disposable in a finite location and adapted to receive a communication channel signal from a mobile terminal located in the finite location; and a controller connected to the sensor array and adapted to calculate a three-dimensional position of the mobile terminal within the finite location in response to receipt of the communication channel signal from the mobile terminal from the sensor array.

A method of another preferred embodiment can include detecting a communication channel signal from a mobile terminal within a finite location, the communication channel signal being transmitted by the mobile terminal in response to a control channel signal received by the mobile terminal; and calculating a position of the mobile terminal in the finite location in response to the detection of the communication channel signal.

Other aspects and features of the present invention are described in detail with reference to the following drawings.

DETAILED DESCRIPTION OF THE PREFERRED EMBODIMENTS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

Figure 1:
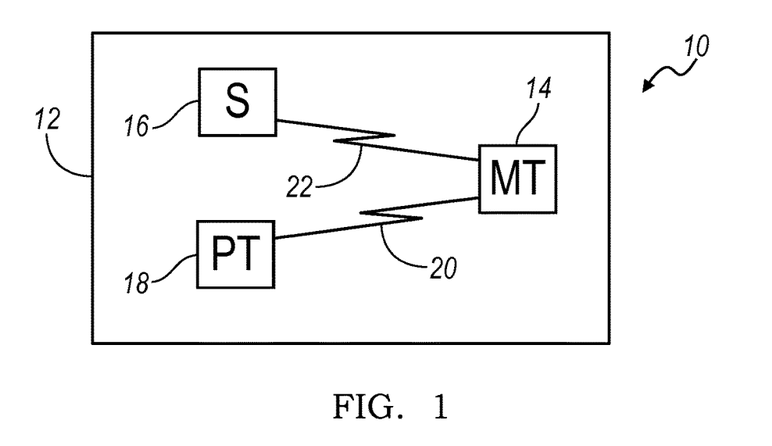
FIG. 1 is a schematic block diagram of a system in accordance with a preferred embodiment of the present invention.

As shown in FIG. 1, a system 10 of the first preferred embodiment can include a pseudo-station 18 disposable in a finite location 12. As used herein, the term finite location should be understood to include any indoor location, outdoor location, or combination thereof having a predetermined and finite geometrical configuration. Example finite locations can include, but are not limited to, an indoor shopping mall, an outdoor shopping mall, an indoor/outdoor shopping mall, an office building, an airport, a subway terminal, a train station, a conference center, a stadium or concert hall, a parking lot, a portion of a block, street, or intersection, as well as any suitable combination thereof. The term finite location can include any adjoining outdoor area to an indoor location, any adjoining indoor location to an outdoor location, and any doors, passages, byways or entrances/exits there between.

The pseudo-station 18 of the system 10 of the first preferred embodiment functions as at least one portion of a base station of the type used in mobile communications over radio frequencies, i.e. mobile telephony networks such as GSM or CDMA networks, WiFi networks, WiMax networks, LTE networks, Bluetooth networks, and the like. Alternatively, the pseudo-station 18 of the system 10 of the first preferred embodiment can function only to interrogate and initiate communications with a mobile terminal 14 on a control channel. The pseudo-station 18 of the system 10 of the first preferred embodiment can be adapted to transmit a control channel signal 20 at a predetermined frequency for a predetermined duration, thereby inducing the mobile terminal 14 to identify itself via a communication channel signal 22.

The system 10 of the first preferred embodiment can also include a sensor 16 disposable in the finite location 12. The sensor 16 of the system 10 of the first preferred embodiment functions to receive and/or detect the communication channel signal 22 from the mobile terminal 14. As used herein, the term communication channel signal 22 should be understood to include any type of signal from a radio device that uniquely identifies the device to a potential network, sometimes referred to as a communication channel or as a signaling channel, depending upon the type of network under consideration. The sensor 16 of the system 10 of the first preferred embodiment can be configured as hardware, firmware or software that is capable of receiving and/or detecting RF transmissions of one or more frequencies of communication channel signals 22 from the mobile terminal 14. The sensor 16 of the system 10 of the first preferred embodiment can be adapted to detect a communication channel signal 22 transmitted by a mobile terminal 14 in the finite location 12, wherein the communication channel signal 22 can include a unique identification of the mobile terminal 14. Example unique identifications of the mobile terminal 14 can include, but are not limited to: an IP address based on a static and/or dynamic number, character or combination such as a MAC address, an IMEI, an IMSI, a TMSI, a Bluetooth device address, a separate identifier associated with an application, software, firmware or operating system of a mobile device, or any other suitable code, number, or identifier that is usable by a mobile terminal 14 in identifying itself to a communication network.

In one variation of the system 10 of the first preferred embodiment, the predetermined frequency at which the pseudo-station 18 transmits the control channel signal 20 can include a frequency range correlated to a selected type of mobile terminal 14. As a non-limiting example, the pseudo-station 18 of the preferred embodiment can transmit a control channel signal 20 on or in a frequency range dedicated to cellular phone mobile terminals (including portions of spectrum dedicated to different types of network protocols such as CDMA and GSM), WiFi enabled mobile terminals, WiMax enabled mobile terminals, LTE enabled mobile terminals, Bluetooth enabled mobile terminals, and the like. Alternatively, the pseudo-station 18 of the system 10 of the first preferred embodiment can be further adapted to transmit the control channel signal 20 on one or more channels within the frequency range. Within a predetermined portion of the RF spectrum that is allocated for a particular type of mobile terminal 14 communication network, there can be multiple channels. Accordingly, the pseudo-station 18 of the system 10 of the first preferred embodiment can be configured to transmit the control channel signal 20 on one, multiple, or all channels within a particular band of frequencies in order to induce communication with various types of mobile terminals 14.

In a second variation of the system 10 of the first preferred embodiment, the predetermined duration for which the pseudo-station 18 transmits the control channel signal 20 ranges between 1 microsecond and 10 seconds. The predetermined duration can be fixed or dynamic, or it can vary between predetermined frequencies and/or channels within the predetermined frequencies. Alternatively, the predetermined duration can be determined, either fixedly or dynamically, as inversely proportional to an activity level within the finite location 12. That is, a shorter predetermined duration can correspond with a higher activity level within the finite location 12. As an example, for a finite location 12 having relatively few users and/or relatively stationary of mobile terminals 14, such as a movie theatre, the predetermined duration can be longer. Conversely, for a finite location 12 having relatively many users and/or mobile users of mobile terminals 14, such as a subway entrance, the predetermined duration can be shorter. A finite location 12 can also have different time periods such as rush hour, holiday shopping/travel, seasons, or other factors that can result in an increase or decrease in the predetermined duration for which the pseudo-station 18 transmits the control channel signal 20.

Figure 2:
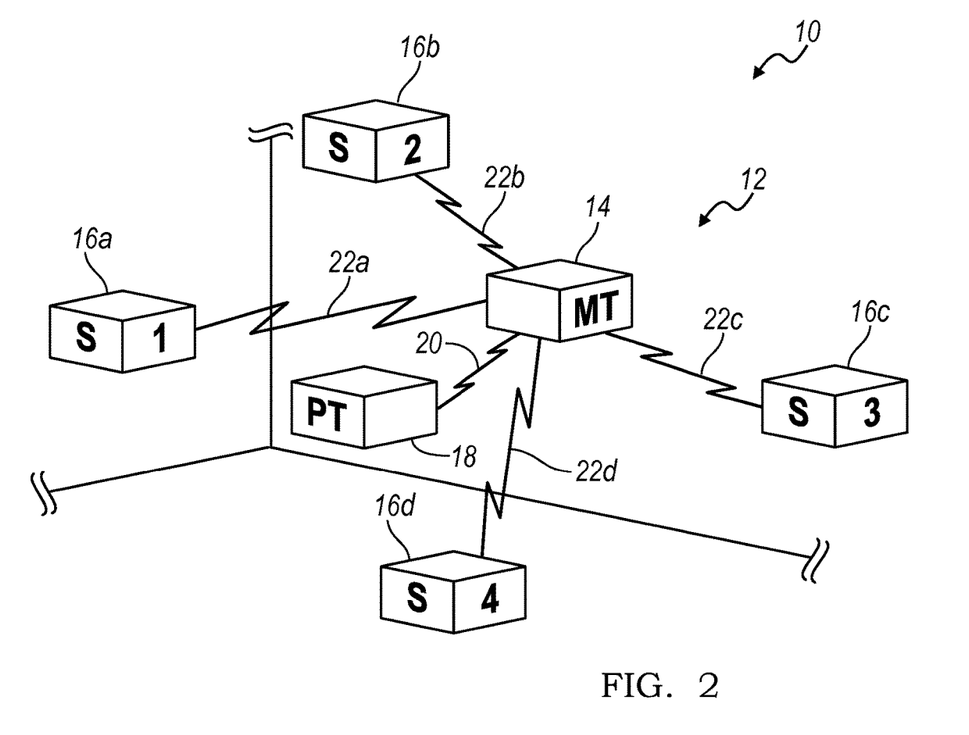
FIG. 2 is a schematic block diagram of a system in accordance with another preferred embodiment of the present invention.

In a third variation of the system 10 of the first preferred embodiment, the system 10 can include multiple sensors 16 to enable a multi-dimensional calculation of a position of the mobile terminal 14 within the finite location 12. As shown in FIG. 2, the second variation of the system 10 of the first preferred embodiment can include a second sensor 16*b*, a third sensor 16*c*, and a fourth sensor 16*d* disposable in the finite location 12. As noted above, the sensors 16*a*, 16*b*, 16*c*, 16*d* of the system 10 of the first preferred embodiment function to receive and/or detect a communication channel signal 22*a*, 22*b*, 22C, 22*d* from the mobile terminal 14. The sensors 16*a*, 16*b*, 16*c*, 16*d* of the system 10 of the first preferred embodiment can be configured as hardware, firmware or software that is capable of receiving and/or detecting RF transmissions of one or more frequencies of communication channel signals 22*a*, 22*b*, 22C, 22*d* from the mobile terminal. The sensors 16*a*, 16*b*, 16*c*, 16*d* of the system 10 of the first preferred embodiment can be adapted to detect a communication channel signal 22*a*, 22*b*, 22C, 22*d* transmitted by a mobile terminal 14 in the finite location 12, wherein the communication channel signal 22*a*, 22*b*, 22C, 22*d* can include a unique identification of the mobile terminal 14. Example unique identifications of the mobile terminal 14 can include, but are not limited to: an IP address based on a static and/or dynamic number, character or combination such as a MAC address, an IMEI, an IMSI, a TMSI, a Bluetooth device address, a separate identifier associated with an application, software, firmware or operating system of a mobile device, or any other suitable code, number, or identifier that is usable by a mobile terminal 14 in identifying itself to a communication network.

Figure 3:
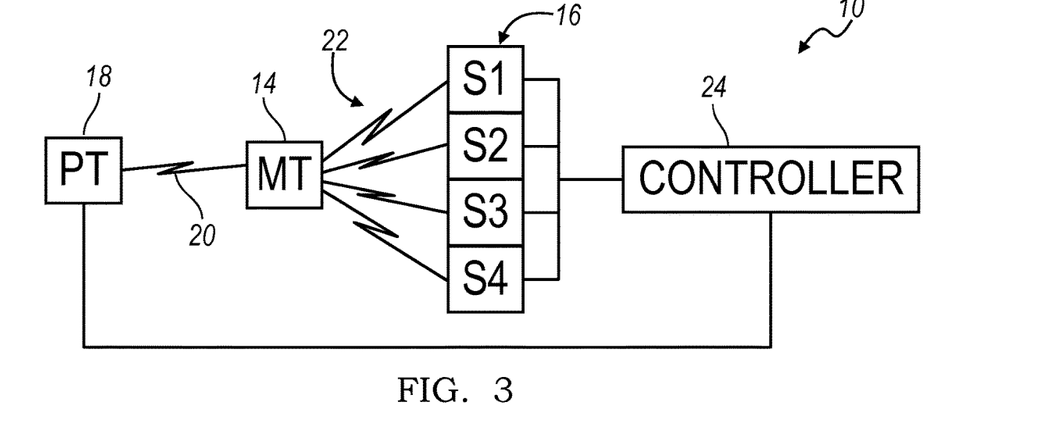
FIG. 3 is a schematic block diagram of a system in accordance with another preferred embodiment of the present invention.
Figure 6:
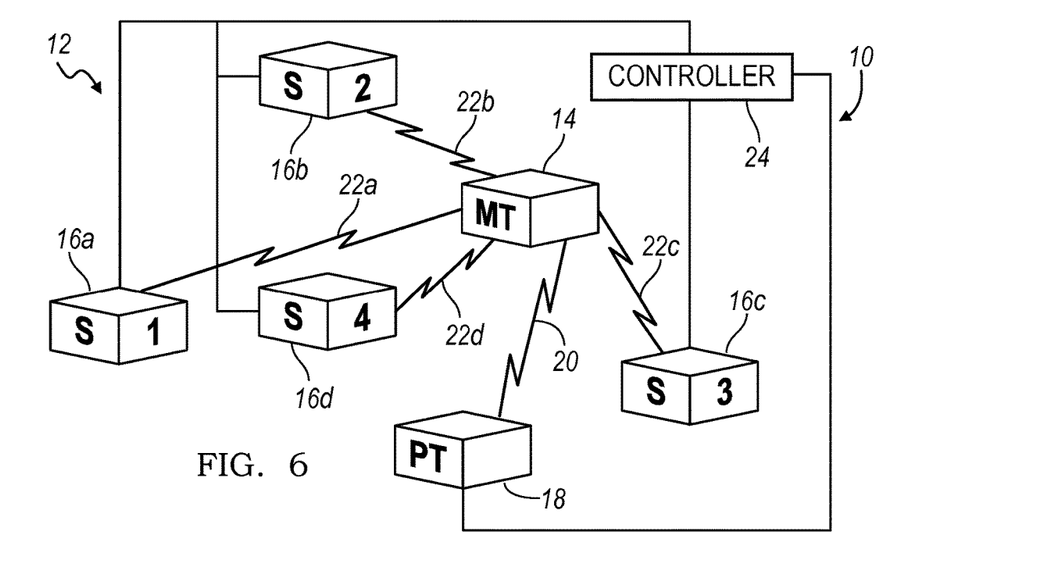
FIG. 6 is a schematic block diagram of a system in accordance with another preferred embodiment of the present invention.

In a third variation of the system 10 of the preferred embodiment shown in FIG. 3 and FIG. 6, the system 10 can include a controller 24 connected to the pseudo-station 18 and the first, second, third and fourth sensors 16*a*, 16*b*, 16*c*, 16*d*. The controller 24 of the first preferred embodiment can function to direct, cause, control and/or determine one or more various functions of the pseudo-station 18 and the sensors 16*a*, 16*b*, 16*c*, 16*d*. The controller 24 can be configured as a single, unified computer device or a cluster or network of several computer devices and may be disposed within or without of the finite location 12. Alternatively, the controller 24 can be integrated into one or more of the other structures of the system 10 of the preferred embodiment, such as for example the pseudo-station 18 and the sensors 16*a*, 16*b*, 16*c*, 16*d*. The controller 24 of the first preferred embodiment can be configured in hardware, software, firmware or any suitable combination thereof, and may have one or more functionalities or processes that are distributed, localized or both in a fixed or dynamic configuration.

In a fourth variation of the system 10 of the first preferred embodiment, the controller 24 can be adapted to calculate a position of the mobile terminal 14 within the first location 12 in response to receipt of the communication channel signal at the first, second, third and fourth sensors 16*a*, 16*b*, 16*c*, 16*d*. Calculation of the position of the mobile terminal 14 can be a function of inputs from any one or more of the sensors 16*a*, 16*b*, 16*c*, 16*d*, including calculation of the position of the mobile terminal 14 in three dimensions in response to inputs from all of the sensors 16*a*, 16*b*, 16*c*, 16*d*. Signals from the sensors 16*a*, 16*b*, 16*c*, 16*d* to the controller 24 can include for example time of flight information indicative of a time lapse in receipt of the communication channel signal 22 and/or intensity or signal strength information indicative of a relative strength or magnitude of the communication channel signal 22 at one or more of the sensors 16*a*, 16*b*, 16*c*, 16*d*.

The controller 24 of the system 10 of the first preferred embodiment can be further configured to calculate the position of the mobile terminal 14 in three dimensions, which can be done in near real time using all four sensors 16*a*, 16*b*, 16*c*, 16*d*. More than four sensors 16*a*, 16*b*, 16*c*, 16*d* can be implemented in the system 10 of the first preferred embodiment, and the controller 24 can also be configured to consider additional information or constraints that enable it to calculate a position of the mobile terminal 14 with four or fewer sensors 16a, 16b, 16c, 16d. For example, if the finite location 12 is relatively planar, then the controller 24 can be configured to calculate a true three dimensional position of the mobile terminal 14 using only three sensors 16a, 16b, 16c, as the fourth sensor 16d cannot provide any additional information about the altitude of the mobile terminal 14 (which is taken as a given in response to an external constraint). Similarly, if the finite location 12 has certain other features or constraints, such as aisles, stairs, escalators, elevators, and the like then the controller 24 can be configured to calculate a position of the mobile terminal 14 in response to data from four or fewer sensors 16a, 16b, 16c, 16d. A finite location 12 can also have different time periods such as rush hour, holiday shopping/travel, seasons, or other factors that can result in an increase or decrease in the predetermined duration for which the pseudo-station 18 transmits the control channel signal 20.

In a fifth variation of the system 10 of the preferred embodiment, the pseudo-station 18 and the sensor 16 can be configured as an integrated cellular base station, such that the pseudo-station 18 and the sensor 16 can function in a unified manner to transmit a control channel signal 20 and to receive one or more communication channel signals 22. Furthermore, the integrated pseudo-station 18 and sensor 16 can be configured for forward transmission of communication channel signals (not shown) to the one or more mobile terminals 14 in its network. The pseudo-station 18 and sensor 16 of the fifth variation of the first preferred embodiment can be configured as any one of a microcell, picocell or femtocell, depending upon the application requirements and the configuration of the finite location 12.

Figure 4:
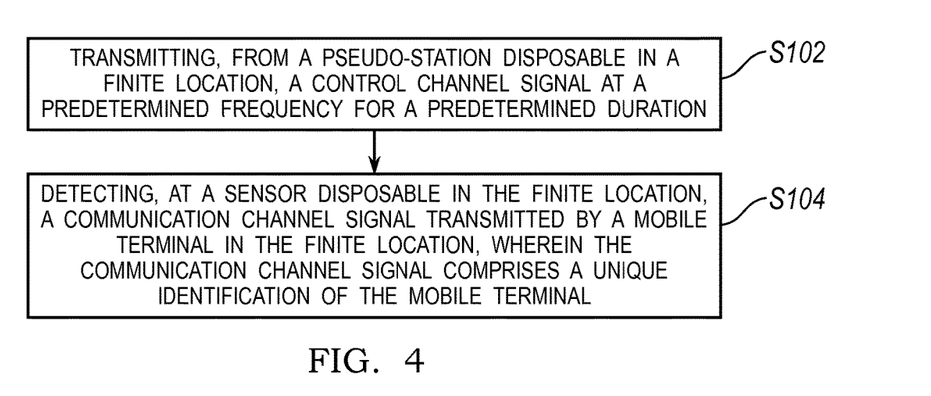
FIG. 4 is a flowchart depicting a method according to another preferred embodiment of the present invention.

As shown in FIG. 4, a method of the second preferred embodiment can be performed using one or more components of a system of the type described herein. The method of the second preferred embodiment can include block S102, which recites transmitting, from a pseudo-station disposable in a finite location, a control channel signal at a predetermined frequency for a predetermined duration. Block S104 of the method of the second preferred embodiment recites detecting, at a sensor disposable in the finite location, a communication channel signal transmitted by a mobile terminal in the finite location, wherein the communication channel signal comprises a unique identification of the mobile terminal.

In a first variation of the method of the second preferred embodiment, the predetermined frequency at which the pseudo-station transmits the control channel signal can include a frequency range correlated to a selected type of mobile terminal. As noted above, the pseudo-station of the preferred embodiment can transmit a control channel signal on or in a frequency range dedicated to cellular phone mobile terminals (including portions of spectrum dedicated to different types of network protocols such as CDMA and GSM), WiFi enabled mobile terminals, WiMax enabled mobile terminals, LTE enabled mobile terminals, Bluetooth enabled mobile terminals, and the like.

Additionally, the pseudo-station of the method of the second preferred embodiment can be further adapted to transmit the control channel signal on one or more channels within the frequency range. As noted above, within a predetermined portion of the RF spectrum that is allocated for a particular type of mobile terminal communication network, there can be multiple channels. Accordingly, the pseudo-station of the method of the second preferred embodiment can be configured to transmit the control channel signal on one, multiple, or all channels within a particular band of frequencies in order to induce communication with various types of mobile terminals.

In a second variation of the method of the second preferred embodiment, the predetermined duration of the transmission of the control channel signal can range between 1 microsecond and 10 seconds. The predetermined duration can be fixed or dynamic, or it can vary between predetermined frequencies and/or channels within the predetermined frequencies. Alternatively, the predetermined duration can be determined, either fixedly or dynamically, as inversely proportional to an activity level within the finite location. A shorter predetermined duration can correspond with a higher activity level within the finite location, such that for a finite location having relatively few users and/or relatively stationary of mobile terminals, such as a movie theatre, the predetermined duration can be longer. Conversely, for a finite location having relatively many users and/or mobile users of mobile terminals, such as a subway entrance, the predetermined duration can be shorter. A finite location 12 can also have different time periods such as rush hour, holiday shopping/travel, seasons, or other factors that can result in an increase or decrease in the predetermined duration for which the pseudo-station 18 transmits the control channel signal 20.

Figure 5:
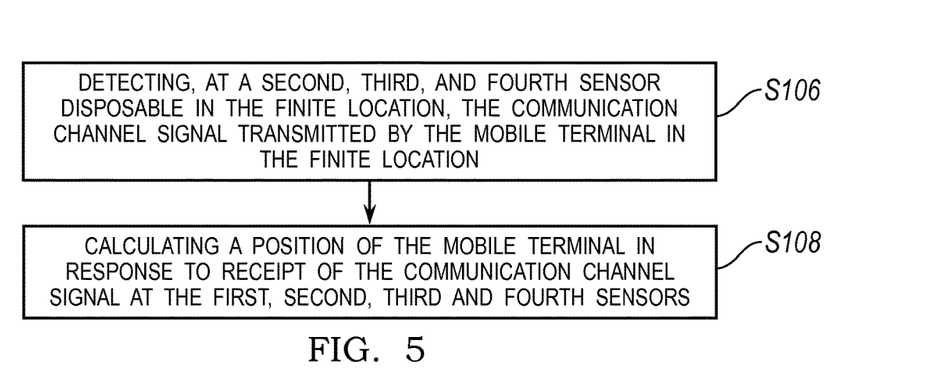
FIG. 5 is a flowchart depicting a method according to another preferred embodiment of the present invention.

As shown in FIG. 5, a third variation of the method of the second preferred embodiment can include block S106, which recites detecting, at a second sensor, a third sensor and a fourth sensor disposable in the finite location, wherein the communication channel signal is transmitted by the mobile terminal in the finite location. The third variation of the method of the second preferred embodiment can further include block S108, which recites calculating a position of the mobile terminal within the first location in response to receipt of the communication channel signal at the first, second, third and fourth sensors.

Calculation of the position of the mobile terminal can be a function of inputs, data, or signals from any one or more of the first, second, third and/or fourth sensors. One alternative of the method of the second preferred embodiment can include calculation of the position of the mobile terminal in three dimensions in response to inputs from all of the sensors. Signals from the sensors can include for example time of flight information indicative of a time lapse in receipt of the communication channel signal and/or intensity or signal strength information indicative of a relative strength or magnitude of the communication channel signal at one or more of the sensors, all or any of which can be used in calculating a position of the mobile terminal relative to the sensors.

More than four sensors can be implemented in the method of the second preferred embodiment. Furthermore, in implementing its position calculation, the method of the second preferred embodiment can account for additional information or constraints that enable it to calculate a position of the mobile terminal with four or fewer sensors. As noted above, if the finite location is relatively planar, then the method of the second preferred embodiment could calculate a true three dimensional position of the mobile terminal using only three sensors, as at least one dimension of the mobile terminal's location is fixed by an external constraint (such as a floor or wall). Similarly, if the finite location has certain other features or constraints, such as aisles, stairs, escalators, elevators, and the like then the method of the second preferred embodiment could calculate a position of the mobile terminal in response to data from four or fewer sensors.

As shown in FIG. 3 and FIG. 6, a system 10 according to a third preferred embodiment can include a first sensor 16a, a second sensor 16b, a third sensor 16c, and a fourth sensor 16d configured in a sensor array disposable in a finite location 12. Each of the sensors 16a, 16b, 16c, 16d can function to receive and/or detect a communication channel signal 22a, 22b, 22C, 22d from the mobile terminal 14. The sensors 16a, 16b, 16c, 16d of the system 10 of the third preferred embodiment can be configured as hardware, firmware or software that is capable of receiving and/or detecting RF transmissions of one or more frequencies of communication channel signals 22a, 22b, 22C, 22d from the mobile terminal 14. The sensors 16a, 16b, 16c, 16d of the system 10 of the third preferred embodiment can be adapted to detect a communication channel signal 22a, 22b, 22C, 22d transmitted by a mobile terminal 14 in the finite location 12, wherein the communication channel signal 22 can include a unique identification of the mobile terminal 14. As noted above, example unique identifications of the mobile terminal 14 can include, but are not limited to: an IP address based on a static and/or dynamic number, character or combination such as a MAC address, an IMEI, an IMSI, a TMSI, a Bluetooth device address, a separate identifier associated with an application, software, firmware or operating system of a mobile device, or any other suitable code, number, or identifier that is usable by a mobile terminal 14 in identifying itself to a communication network.

The system 10 of the third preferred embodiment can further include a controller 24 connected to the sensor array 16a, 16b, 16c, 16d. The controller 24 can be adapted to calculate a three-dimensional position of the mobile terminal 14 within the finite location 12 in response to receipt of the communication channel signal from the mobile terminal 14 at each of the first, second, third and fourth sensors 16a, 16b, 16c, 16d. Calculation of the position of the mobile terminal 14 can be a function of inputs from any one or more of the sensors 16a, 16b, 16c, 16d, including calculation of the position of the mobile terminal 14 in three dimensions in response to inputs from all of the sensors 16a, 16b, 16c, 16d. Signals from the sensors 16a, 16b, 16c, 16d to the controller 24 can include for example time of flight information indicative of a time lapse in receipt of the communication channel signal 22 and/or intensity or signal strength information indicative of a relative strength or magnitude of the communication channel signal 22 at one or more of the sensors 16a, 16b, 16c, 16d.

Calculation of the position of the mobile terminal 14 in three dimensions can be done in near real time using all four sensors 16a, 16b, 16c, 16d. More than four sensors 16a, 16b, 16c, 16d can be implemented in the system 10 of the third preferred embodiment, and the controller 24 can also be configured to consider additional information or constraints that enable it to calculate a position of the mobile terminal 14 with four or fewer sensors 16a, 16b, 16c, 16d. As noted above, if the finite location 12 is relatively planar, then the controller 24 can be configured to calculate a true three dimensional position of the mobile terminal 14 using only three sensors 16a, 16b, 16c, as the altitude of the mobile terminal 14 is a known constant. Likewise, if the finite location 12 has certain other features or constraints, such as aisles, stairs, escalators, elevators, and the like then the controller 24 can be configured to calculate a position of the mobile terminal 14 in response to data from four or fewer sensors 16a, 16b, 16c, 16d. A finite location 12 can also have different time periods such as rush hour, holiday shopping/travel, seasons, or other factors that can result in an increase or decrease in the predetermined duration for which the pseudo-station 18 transmits the control channel signal 20.

The controller 24 of the third preferred embodiment can function to direct, cause, control and/or determine one or more various functions of a pseudo-station 18 and the sensors 16a, 16b, 16c, 16d. The controller 24 of the third preferred embodiment can be configured as a single, unified computer device or a cluster or network of several computer devices and may be disposed within or without of the finite location 12. Alternatively, the controller 24 can be integrated into one or more of the other structures of the system 10 of the third preferred embodiment, such as for example the pseudo-station 18 and the sensors 16a, 16b, 16c, 16d. The controller 24 of the third preferred embodiment can be configured in hardware, software, firmware or any suitable combination thereof, and may have one or more functionalities or processes that are distributed, localized or both in a fixed or dynamic configuration.

The system 10 of the third preferred embodiment can also include a pseudo-station 18 disposable in the finite location 12 and connected to the controller 24. The pseudo-station 18 of the third preferred embodiment functions to induce a communication channel 22a, 22b, 22C, 22d signal from the mobile terminal 14 by transmitting a control channel signal 20 in the finite location 12.

In a first variation of the system 10 of the third preferred embodiment, the sensor array 16a, 16b, 16c, 16d can be disposed in a predetermined geometrical configuration within the finite location 12. The predetermined geometrical configuration can be of any suitable geometry, including linear, planar (two-dimensional polygon) or a three-dimensional polygon. Alternatively, the predetermined geometrical configuration can include a polygon having substantially uniform sides, such as for example a square configuration in a two-dimensional configuration or a tetrahedral pyramid in a three-dimensional configuration. In another alternative of the first variation of the system 10 of the third preferred embodiment, the sides of the predetermined geometrical configuration can be of substantially non-uniform length and/or variable or adjustable in response to an activity level within the finite location 12.

In another alternative of the first variation of the system 10 of the third preferred embodiment, the substantially uniform predetermined length can be inversely proportional to a confidence level of the three-dimensional position of the mobile terminal. That is, if the sensors 16a, 16b, 16c, 16d are relatively closely spaced, then the confidence level with which the controller 24 computes the position of the mobile terminal 14 will be increased. Conversely, if the sensors 16a, 16b, 16c, 16d are relatively distally spaced, then the confidence level with which the controller 24 computes the position of the mobile terminal 14 will be decreased. For example, at a predetermined length measuring approximately eight meters, the controller 24 can compute the position of the mobile terminal 14 to within one meter. As the predetermined length decreases/increases from eight meters, the confidence level of the position of the mobile terminal 14 can increase/decrease accordingly.

In a second variation of the system 10 of the third preferred embodiment, the system 10 can include a fifth sensor (not shown) integrated with the pseudo-station 18. In the second variation of the system 10 of the third preferred embodiment, the pseudo-station 18 and the fifth sensor can function in a unified manner to transmit a control channel signal 20 and to receive one or more communication channel signals 22a, 22b, 22C, 22d. Furthermore, the integrated pseudo-station 18 and fifth sensor can be configured for forward transmission of communication channel signals (not shown) to the one or more mobile terminals 14 in its network. The pseudo-station 18 and fifth sensor of the second variation of the system 10 of the third preferred embodiment can be configured as any one of a microcell, picocell or femtocell, depending upon the application requirements and the configuration of the finite location 12.

In a third variation of the system 10 of the third preferred embodiment, the predetermined frequency at which the pseudo-station 18 transmits the control channel signal 20 can include a frequency range correlated to a selected type of mobile terminal. As a non-limiting example, the pseudo-station 18 of the preferred embodiment can transmit a control channel signal 20 on or in a frequency range dedicated to cellular phone mobile terminals (including portions of spectrum dedicated to different types of network protocols such as CDMA and GSM), WiFi enabled mobile terminals, WiMax enabled mobile terminals, LTE enabled mobile terminals, Bluetooth enabled mobile terminals, and the like. Alternatively, the pseudo-station 18 of the system 10 of the third preferred embodiment can be further adapted to transmit the control channel signal 20 on one or more channels within the frequency range. Within a predetermined portion of the RF spectrum that is allocated for a particular type of mobile terminal 14 communication network, there can be multiple channels. Accordingly, the pseudo-station 18 of the system 10 of the third preferred embodiment can be configured to transmit the control channel signal 20 on one, multiple, or all channels within a particular band of frequencies in order to induce communication with various types of mobile terminals 14.

The pseudo-station 18 of the third variation of the system 10 of the third preferred embodiment can be further adapted to re-transmit the control channel signal 20 on any selected frequency band after a predetermined interval. For example, the pseudo-station 18 of the third preferred embodiment can be configured to periodically sweep a large frequency range that includes all types of mobile terminals 14 available for wireless communications. The intervals at which the pseudo-station 18 repeats a transmission in a particular frequency can be determined in part by a predetermined by a duration for which the pseudo-station transmits on each channel within each frequency band.

In a fourth variation of the system 10 of the third preferred embodiment, the predetermined duration for which the pseudo-station 18 transmits the control channel signal 20 ranges between 1 microsecond and 10 seconds. The predetermined duration can be fixed or dynamic, or it can vary between predetermined frequencies and/or channels within the predetermined frequencies. As noted above, the predetermined duration can also be determined, either fixedly or dynamically, as inversely proportional to an activity level within the finite location 12. That is, a shorter predetermined duration can correspond with a higher activity level within the finite location 12. As an example, for a finite location 12 having relatively few users and/or relatively stationary of mobile terminals 14, such as a movie theatre, the predetermined duration can be longer. Conversely, for a finite location 12 having relatively many users and/or mobile users of mobile terminals 14, such as a subway entrance, the predetermined duration can be shorter. A finite location 12 can also have different time periods such as rush hour, holiday shopping/travel, seasons, or other factors that can result in an increase or decrease in the predetermined duration for which the pseudo-station 18 transmits the control channel signal 20.

As shown in FIG. 3 and FIG. 6, a system 10 according to a fourth preferred embodiment can include a pseudo-station 18 disposable in a finite location 12 and adapted to transmit a control channel signal 20. The pseudo-station 18 of the third preferred embodiment functions to induce a communication channel 22a, 22b, 22C, 22d signal from the mobile terminal 14 by transmitting a control channel signal 20 in the finite location 12.

The system 10 of the fourth preferred embodiment can further include a controller 24 connected to the pseudo-station 18. The controller 24 of the system 10 of the fourth preferred embodiment can be adapted to control the pseudo-station 18 to transmit the control channel signal 20 at a predetermined frequency and for a predetermined duration. Further, the controller 24 of the system 10 of the fourth preferred embodiment can be adapted to calculate a position of a mobile terminal 14 within the finite location 12 in response to a detected communication channel signal 22 from the mobile terminal 14, wherein the communication channel signal can be induced in response to the control channel signal 20. The controller 24 of the fourth preferred embodiment can be configured as a single, unified computer device or a cluster or network of several computer devices and may be disposed within or without of the finite location 12. Alternatively, the controller 24 can be integrated into one or more of the other structures of the system 10 of the fourth preferred embodiment, such as for example the pseudo-station 18 and the sensors 16a, 16b, 16c, 16d. The controller 24 of the fourth preferred embodiment can be configured in hardware, software, firmware or any suitable combination thereof, and may have one or more functionalities or processes that are distributed, localized or both in a fixed or dynamic configuration.

In a first variation of the system 10 of the fourth preferred embodiment, the predetermined frequency at which the pseudo-station 18 transmits the control channel signal 20 can include a frequency range correlated to a selected type of mobile terminal 14. As a non-limiting example, the pseudo-station 18 of the preferred embodiment can transmit a control channel signal 20 on or in a frequency range dedicated to cellular phone mobile terminals (including portions of spectrum dedicated to different types of network protocols such as CDMA and GSM), WiFi enabled mobile terminals, WiMax enabled mobile terminals, LTE enabled mobile terminals, Bluetooth enabled mobile terminals, and the like. Alternatively, the pseudo-station 18 of the system 10 of the fourth preferred embodiment can be further adapted to transmit the control channel signal 20 on one or more channels within the frequency range. As noted above, for each predetermined portion of the RF spectrum that is allocated for a particular type of mobile terminal 14 communication network there can be multiple channels. Accordingly, the pseudo-station 18 of the system 10 of the fourth preferred embodiment can be configured to transmit the control channel signal 20 on one, multiple, or all channels within a particular band of frequencies in order to induce communication with various types of mobile terminals 14.

The pseudo-station 18 of the first variation of the system 10 of the fourth preferred embodiment can be further adapted to re-transmit the control channel signal 20 on any selected frequency band after a predetermined interval. For example, the pseudo-station 18 of the fourth preferred embodiment can be configured to periodically sweep a large frequency range that includes all types of mobile terminals 14 available for wireless communications. The intervals at which the pseudo-station 18 repeats a transmission in a particular frequency can be determined in part by a predetermined by a duration for which the pseudo-station transmits on each channel within each frequency band.

In a second variation of the system 10 of the fourth preferred embodiment, the predetermined duration for which the pseudo-station 18 transmits the control channel signal 20 ranges between 1 microsecond and 10 seconds. The predetermined duration can be fixed or dynamic, or it can vary between predetermined frequencies and/or channels within the predetermined frequencies. As noted above, the predetermined duration can also be determined, either fixedly or dynamically, as inversely proportional to an activity level within the finite location 12. That is, a shorter predetermined duration can correspond with a higher activity level within the finite location 12. As an example, for a finite location 12 having relatively few users and/or relatively stationary of mobile terminals 14, such as a movie theatre, the predetermined duration can be longer. Conversely, for a finite location 12 having relatively many users and/or mobile users of mobile terminals 14, such as a subway entrance, the predetermined duration can be shorter. A finite location 12 can also have different time periods such as rush hour, holiday shopping/travel, seasons, or other factors that can result in an increase or decrease in the predetermined duration for which the pseudo-station 18 transmits the control channel signal 20.

As shown in FIGS. 3 and 6, a system 10 according to a fifth preferred embodiment can include a first sensor 16a, a second sensor 16b, a third sensor 16c, and a fourth sensor 16d configured as an array and disposable in a finite location 12. Each of the sensors 16a, 16b, 16c, 16d can function to receive and/or detect a communication channel signal 22a, 22b, 22C, 22d from the mobile terminal 14. The sensors 16a, 16b, 16c, 16d of the system 10 of the fifth preferred embodiment can be configured as hardware, firmware or software that is capable of receiving and/or detecting RF transmissions of one or more frequencies of communication channel signals 22a, 22b, 22C, 22d from the mobile terminal 14. The sensors 16a, 16b, 16c, 16d of the system 10 of the fifth preferred embodiment can be adapted to detect a communication channel signal 22a, 22b, 22C, 22d transmitted by a mobile terminal 14 in the finite location 12, wherein the communication channel signal 22 can include a unique identification of the mobile terminal 14. Example unique identifications of the mobile terminal 14 can include, but are not limited to: a MAC address, an IMEI, an IMSI, a TMSI, or any other suitable code, number, or identifier that is usable by a mobile terminal 14 in identifying itself to a communication network.

The system 10 of the fifth preferred embodiment can further include a controller 24 connected to the sensor array 16a, 16b, 16c, 16d. The controller 24 can be adapted to calculate a three-dimensional position of the mobile terminal 14 within the finite location 12 in response to receipt of the communication channel signal from the mobile terminal 14 at each of the first, second, third and fourth sensors 16a, 16b, 16c, 16d. Calculation of the position of the mobile terminal 14 can be a function of inputs from any one or more of the sensors 16a, 16b, 16c, 16d, including calculation of the position of the mobile terminal 14 in three dimensions in response to inputs from all of the sensors 16a, 16b, 16c, 16d. Signals from the sensors 16a, 16b, 16c, 16d to the controller 24 of the system 10 of the fifth preferred embodiment can include for example time of flight information indicative of a time lapse in receipt of the communication channel signal 22 and/or intensity or signal strength information indicative of a relative strength or magnitude of the communication channel signal 22 at one or more of the sensors 16a, 16b, 16c, 16d.

Calculation of the position of the mobile terminal 14 in three dimensions can be done in near real time using all four sensors 16a, 16b, 16c, 16d. More than four sensors 16a, 16b, 16c, 16d can be implemented in the system 10 of the fifth preferred embodiment, and the controller 24 can also be configured to consider additional information or constraints that enable it to calculate a position of the mobile terminal 14 with four or fewer sensors 16a, 16b, 16c, 16d. As noted above, if the finite location 12 is relatively planar, then the controller 24 can be configured to calculate a true three dimensional position of the mobile terminal 14 using only three sensors 16a, 16b, 16c, as the altitude of the mobile terminal 14 is a known constant. Likewise, if the finite location 12 has certain other features or constraints, such as aisles, stairs, escalators, elevators, and the like then the controller 24 can be configured to calculate a position of the mobile terminal 14 in response to data from four or fewer sensors 16a, 16b, 16c, 16d.

In a first variation of the system 10 of the fifth preferred embodiment, the sensor array 16a, 16b, 16c, 16d can be disposed in a predetermined geometrical configuration within the finite location 12. The predetermined geometrical configuration can be of any suitable geometry, including linear, planar (two-dimensional polygon) or a three-dimensional polygon. Alternatively, the predetermined geometrical configuration can include a polygon having substantially uniform sides, such as for example a square configuration in a two-dimensional configuration or a tetrahedral pyramid in a three-dimensional configuration. In another alternative of the first variation of the system 10 of the third preferred embodiment, the sides of the predetermined geometrical configuration can be of substantially non-uniform length and/or variable or adjustable in response to an activity level within the finite location 12.

In another alternative of the first variation of the system 10 of the fifth preferred embodiment, the substantially uniform predetermined length can be inversely proportional to a confidence level of the three-dimensional position of the mobile terminal 14. That is, if the sensors 16a, 16b, 16c, 16d are relatively closely spaced, then the confidence level with which the controller 24 computes the position of the mobile terminal 14 can be increased. Conversely, if the sensors 16a, 16b, 16c, 16d are relatively distally spaced, then the confidence level with which the controller 24 computes the position of the mobile terminal 14 can be decreased. For example, at a predetermined length measuring approximately eight meters, the controller 24 can compute the position of the mobile terminal 14 to within one meter. As the predetermined length decreases/increases from eight meters, the confidence level of the position of the mobile terminal 14 can increase/decrease accordingly.

In a second variation of the system 10 of the fifth preferred embodiment, the system 10 can include a fifth sensor (not shown) integrated with or including a pseudo-station 18. In the second variation of the system 10 of the fifth preferred embodiment, the pseudo-station 18 and the fifth sensor can function in a unified manner to transmit a control channel signal 20 and to receive one or more communication channel signals 22a, 22b, 22C, 22d. Additionally, the integrated pseudo-station 18 and fifth sensor can be configured for forward transmission of communication channel signals (not shown) to the one or more mobile terminals 14 in its network. The pseudo-station 18 and fifth sensor of the second variation of the system 10 of the third preferred embodiment can be configured as any one of a microcell, picocell or femtocell, depending upon the application requirements and the configuration of the finite location 12.

Figure 7:
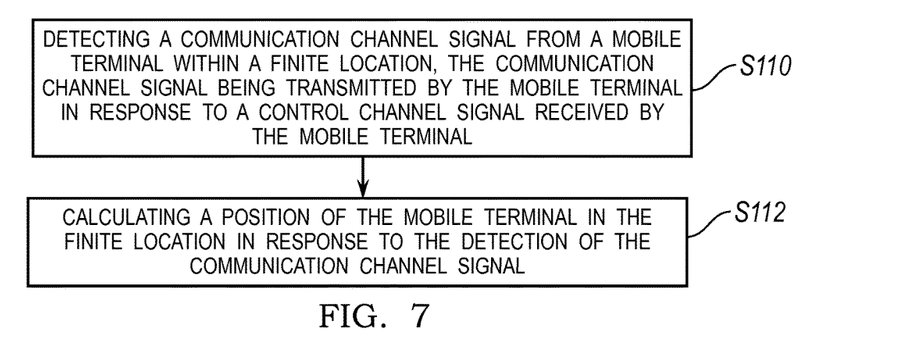
FIG. 7 is a flowchart depicting a method according to another preferred embodiment of the present invention.

FIG. 7 is a flowchart depicting a method according to a sixth preferred embodiment of the present invention. As shown therein, the method of the sixth preferred embodiment can include block S110, which recites detecting a communication channel signal from a mobile terminal within a finite location, the communication channel signal being transmitted by the mobile terminal in response to a control channel signal received by the mobile terminal. The method of the sixth preferred embodiment can also include block S112, which recites calculating a position of the mobile terminal in the finite location in response to the detection of the communication channel signal.

In a first variation of the method of the sixth preferred embodiment, detecting a communication channel signal can include detecting a communication channel signal at one or more sensors disposed in the finite location. The one or more sensors can be of the type described herein with respect to other preferred embodiments, and as such can function to receive and/or detect the communication channel signal from the mobile terminal. A sensor according to the method of the sixth preferred embodiment can be configured as hardware, firmware or software that is capable of receiving and/or detecting RF transmissions of one or more frequencies of communication channel signals from the mobile terminal. Furthermore, the communication channel signal can include a unique identification of the mobile terminal. Example unique identifications of the mobile terminal 14 can include, but are not limited to: an IP address based on a static and/or dynamic number, character or combination such as a MAC address, an IMEI, an IMSI, a TMSI, a Bluetooth device address, a separate identifier associated with an application, software, firmware or operating system of a mobile device, or any other suitable code, number, or identifier that is usable by a mobile terminal 14 in identifying itself to a communication network.

Alternatively, detecting a communication channel signal according to the method of the sixth preferred embodiment can include detecting a communication channel signal at four or more sensors disposed in the finite location. The four or more sensors of the first variation of the method of the sixth preferred embodiment can be of the type and functionality described above. The four or more sensors can be disposed or arranged in an array having a particular or variable shape and/or size as described herein in order to optimize the use of the sensors and the confidence level of the position calculation.

In another variation of the method of the sixth preferred embodiment, calculating a position of the mobile terminal can include calculating a three-dimensional position of the mobile terminal in response to the detection of the communication channel signal at four or more sensors. Calculating the position of the mobile terminal can be accomplished for example by a controller of the type described herein. Calculation of the position of the mobile terminal can be a function of inputs, data, or signals from any one or more of the first, second, third and/or fourth sensors. Signals from the sensors can include for example time of flight information indicative of a time lapse in receipt of the communication channel signal and/or intensity or signal strength information indicative of a relative strength or magnitude of the communication channel signal at one or more of the sensors, all or any of which can be used in calculating a position of the mobile terminal relative to the sensors.

More than four sensors can be implemented in the method of the sixth preferred embodiment. Furthermore, in implementing its position calculation, the method of the sixth preferred embodiment can account for additional information or constraints that enable it to calculate a position of the mobile terminal with four or fewer sensors. As noted above, if the finite location is relatively planar, then the method of the second preferred embodiment could calculate a true three dimensional position of the mobile terminal using only three sensors, as at least one dimension of the mobile terminal's location is fixed by an external constraint (such as a floor or wall). Similarly, if the finite location has certain other features or constraints, such as aisles, stairs, escalators, elevators, and the like then the method of the second preferred embodiment could calculate a position of the mobile terminal in response to data from four or fewer sensors.

Figure 8:
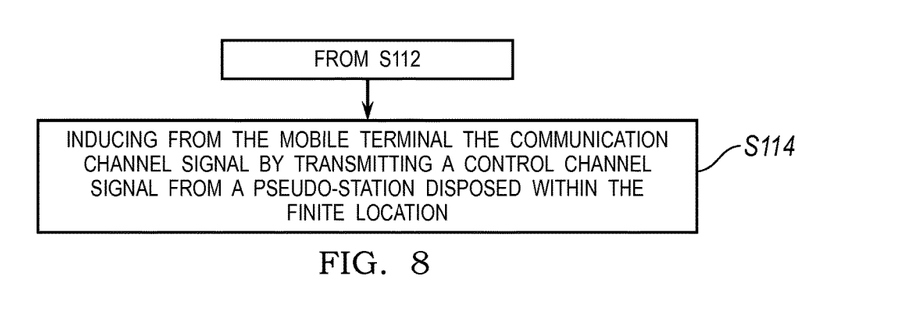
FIG. 8 is a flowchart depicting a method according to another preferred embodiment of the present invention.

As shown in FIG. 8, another variation of the method of the sixth preferred embodiment can include block S114, which recites inducing from the mobile terminal the communication channel signal by transmitting a control channel signal from a pseudo-station disposed within the finite location. The pseudo-station of the method of the sixth preferred embodiment functions as at least one portion of a base station of the type used in mobile communications, i.e. mobile telephony networks such as GSM or CDMA networks, WiFi networks, WiMax networks, LTE networks, Bluetooth networks, and the like. Alternatively, the pseudo-station of the method of the sixth preferred embodiment can function only to interrogate and initiate communications with a mobile terminal on a control channel. As noted herein, the pseudo-station of the method of the sixth preferred embodiment can be adapted to transmit a control channel signal at a predetermined frequency for a predetermined duration, thereby inducing the mobile terminal to identify itself via a communication channel signal.

The pseudo-station of the method of the sixth preferred embodiment can be connected to a controller adapted to control a frequency band for transmission, a duration of transmission, and an interval after which each selected frequency or frequencies are retransmitted. As noted above, the pseudo-station can be a unitary apparatus having a separate functionality, or it can be integrated into a sensor of the type described herein and further configured for forward communication channel transmissions to one or more mobile terminals in the finite location.

The flowcharts and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular terms "a", "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements and specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The preferred embodiments were chosen and described in order to best explain the principles of the invention and the practical applications, and to enable others of ordinary skill in the art to understand the invention for various embodiments with various modifications as are suited to the particular use contemplated.

What is claimed is:

1. A system comprising:
   a pseudo-station disposed in a finite location, the pseudo-station adapted to transmit a control channel signal at a predetermined RF spectrum frequency for a predetermined duration to interrogate and prompt a response from one or more mobile terminals within said finite location; and
   a sensor having a range limited to a building structure and/or area proximate said building structure and disposed in the finite location, the sensor adapted to detect whether one or more mobile terminals are within said finite location by detecting one or more communication channel signals in said RF spectrum frequency transmitted by mobile terminals within said sensor range, said one or more communication channel signals transmitted by said one or more mobile terminals responsive to receiving said control channel signal transmitted by said pseudo-station, said control channel signal and one or more communication channel signals transmitted passively without user intervention, wherein the one or more communication channel signals each comprise a unique identification of the mobile terminal transmitting the responsive one or more communication channel signals.

2. The system of claim 1, wherein the predetermined RF spectrum frequency comprises a RF spectrum frequency range correlated to a selected type of mobile terminal.

3. The system of claim 2, wherein the pseudo-station is further adapted to transmit the control channel signal on one or more channels within the RF spectrum frequency range.

4. The system of claim 2, wherein the RF spectrum frequency range comprises a portion of electromagnetic spectrum allocated for wireless communication by one or more selected types of mobile terminals.

5. The system of claim 1, wherein the predetermined duration ranges between 1 microsecond and 10 seconds.

6. The system of claim 5, wherein the predetermined duration is inversely proportional to an activity level within the finite location.

7. The system of claim 1, further comprising a second sensor, a third sensor, and a fourth sensor disposable in the finite location and adapted to detect the one or more communication channel signals transmitted by the mobile terminal in the finite location.

8. The system of claim 7, further comprising a controller connected to the pseudo-station and the first, second, third and fourth sensors.

9. The system of claim 8, wherein the controller is adapted to calculate a position of the mobile terminal within the first location in response to receipt of the one or more communication channel signals at the first, second, third and fourth sensors.

10. The system of claim 9, wherein the position of the mobile terminal is calculated in three dimensions.

11. The system of claim 1, wherein the pseudo-station and the sensor comprise an integrated cellular base station.

12. The system of claim 11, wherein the integrated cellular base station comprises a femtocell.

13. A method comprising:
    transmitting, from a pseudo-station disposed in a finite location, a control channel signal at a predetermined RF spectrum frequency for a predetermined duration to interrogate and prompt a response from one or more mobile terminals within said finite location; and
    detecting at a sensor disposed in the finite location, one or more communication channel signals in the RF spectrum transmitted by a mobile terminal within a range of said sensor, said one or more communication channel signals transmitted by said one or more mobile terminals responsive to receiving said control channel signal transmitted by said pseudo-station, said control channel signal and one or more communication channel signals transmitted passively without user intervention, wherein the one or more communication channel signals each comprise a unique identification of the mobile terminal transmitting the one or more communication channel signals.

14. The method of claim 13, wherein the predetermined RF spectrum frequency comprises a RF spectrum frequency range correlated to a selected type of mobile terminal.

15. The method of claim 14, wherein the pseudo-station is further adapted to transmit the control channel signal on one or more channels within the RF spectrum frequency range.

16. The method of claim 14, wherein the RF spectrum frequency range comprises a portion of electromagnetic spectrum allocated for wireless communication by one or more selected types of mobile terminals.

17. The method of claim 13, wherein the predetermined duration ranges between 1 microsecond and 10 seconds.

18. The method of claim 17, wherein the predetermined duration is inversely proportional to an activity level within the finite location.

19. The method of claim 13, further comprising detecting, at a second sensor, a third sensor and a fourth sensor disposable in the finite location, the one or more communication channel signals transmitted by the mobile terminal in the finite location.

20. The method of claim 19, further comprising calculating a position of the mobile terminal within the first location in response to receipt of the one or more communication channel signals at the first, second, third and fourth sensors.

21. The method of claim 20, wherein the position of the mobile terminal is calculated in three dimensions.

22. A system comprising:
- a sensor array disposable in a finite location and comprising first, second, third and fourth sensors, each of the first second, third and fourth sensors adapted to receive one or more communication channel signals in the RF spectrum from a mobile terminal located in the finite location, said finite location defined by a range of coverage of said sensor array and limited to a building structure and/or area proximate said building structure;
- a controller connected to the sensor array and adapted to calculate a three-dimensional position of the mobile terminal within the finite location in response to receipt of the one or more communication channel signals in the RF spectrum from the mobile terminal within said range of said sensor array at each of the first, second, third and fourth sensors; and
- a pseudo-station disposed in the finite location and connected to the controller and adapted to induce a communication channel signal from the mobile terminal by transmitting a control channel signal in the finite location at a predetermined RF spectrum frequency to interrogate and prompt a response from one or more mobile terminals in range of the sensor array.

23. The system of claim 22, wherein the sensor array comprises a predetermined geometrical configuration within the finite location.

24. The system of claim 23, wherein the geometrical configuration comprises a polygon, the sides of which are of a substantially uniform predetermined length.

25. The system of claim 24, wherein the substantially uniform predetermined length is inversely proportional to a confidence level of the three-dimensional position of the mobile terminal.

26. The system of claim 22, further comprising a fifth sensor integrated with the pseudo-station.

27. The system of claim 22, wherein the pseudo-station is adapted to transmit the control channel signal on a predetermined RF spectrum frequency.

28. The system of claim 27, wherein the predetermined RF spectrum frequency comprises one or more RF spectrum frequency bands correlated with one or more types of mobile terminals.

29. The system of claim 28, wherein the pseudo-station is further adapted to re-transmit the control channel signal on the RF spectrum frequency band after a predetermined interval.

30. The system of claim 22, wherein the pseudo-station is adapted to transmit the control channel signal for a predetermined duration.

31. The system of claim 30, wherein the predetermined duration ranges between 1 microsecond and 10 seconds.

32. A system comprising:
- a pseudo-station disposable in a finite location and adapted to transmit a control channel signal at a predetermined RF spectrum frequency for a predetermined duration to interrogate and prompt a response from one or more mobile terminals within said finite location, said finite location defined by a range of coverage of said sensor array and limited to a building structure and/or area proximate said building structure; and
- a controller connected to the pseudo-station and adapted to control the pseudo station to transmit the control channel signal at a predetermined RF spectrum frequency and for a predetermined duration, the controller further adapted to calculate a position of a mobile terminal within the finite location in response to a detected communication channel signal from the mobile terminal within a range of a sensor within said finite location and without the need for a call being placed by said mobile terminal, the one or more communication channel signals induced in response to the control channel signal.

33. The system of claim 32, wherein the pseudo-station is adapted to transmit the control channel signal on a predetermined RF spectrum frequency.

34. The system of claim 33, wherein the predetermined RF spectrum frequency comprises one or more RF spectrum frequency bands correlated with one or more types of mobile terminals.

35. The system of claim 34, wherein the pseudo-station is further adapted to re-transmit the control channel signal on the RF spectrum frequency band after a predetermined interval.

36. The system of claim 32, wherein the pseudo-station is adapted to transmit the control channel signal for a predetermined duration.

37. The system of claim 36, wherein the predetermined duration ranges between 1 microsecond and 10 seconds.

38. A system comprising:
- a sensor array disposable in a finite location and comprising first, second, third and fourth sensors, each of the first second, third and fourth sensors adapted to receive one or more communication channel signals in the RF spectrum from a mobile terminal located in the finite location, said finite location defined by coverage range of said sensor array and limited to a building structure and/or area proximate said building structure; and
- a controller connected to the sensor array and adapted to calculate a three-dimensional position of the mobile terminal within the finite location in response to receipt of the one or more communication channel signals in the RF spectrum from the mobile terminal within said range of said sensor array at each of the first, second, third and fourth sensors, the one or more communication channel signals transmitted in response to a control channel signal transmitted by a pseudo-station to interrogate and prompt a response from one or more mobile terminals within said finite location.

39. The system of claim 38, wherein the sensor array comprises a predetermined geometrical configuration within the finite location.

40. The system of claim 39, wherein the geometrical configuration comprises a polygon, the sides of which are of a substantially uniform predetermined length.

41. The system of claim 40, wherein the substantially uniform predetermined length is inversely proportional confidence level of the three-dimensional position of the mobile terminal.

42. The system of claim 38, further comprising a fifth sensor in the sensor array, the fifth sensor comprising a pseudo-station adapted to transmit the control channel signal.

* * * * *